(12) United States Patent
Usherovich

(10) Patent No.: US 6,272,975 B1
(45) Date of Patent: Aug. 14, 2001

(54) ROTISSERIE COOKING APPARATUS

(75) Inventor: Boris Usherovich, Staten Island, NY (US)

(73) Assignee: Franklin Industries, LLC, Brooklyn, NY (US)

( * ) Notice: Subject to any disclaimer, the term of this patent is extended or adjusted under 35 U.S.C. 154(b) by 0 days.

(21) Appl. No.: 09/542,299

(22) Filed: Apr. 4, 2000

Related U.S. Application Data

(60) Provisional application No. 60/161,964, filed on Oct. 28, 1999.

(51) Int. Cl.$^7$ ................ A47J 1/00; A47J 37/00; A47J 37/06
(52) U.S. Cl. ................ 99/331; 99/337; 99/393; 99/397; 99/421 V; 99/427
(58) Field of Search .............. 99/427, 393, 397, 99/421 V, 419, 421 P, 395, 421 H, 333, 332, 331, 337

(56) References Cited

U.S. PATENT DOCUMENTS

| | | |
|---|---|---|
| 2,629,314 | 2/1953 | Vardy ........................ 99/427 |
| 2,649,852 * | 8/1953 | McCandless ............. 99/427 |
| 2,821,903 * | 2/1958 | Allen, Jr. et al. ........ 99/338 |
| 3,221,638 | 12/1965 | Wickenberg . |
| 4,270,444 | 6/1981 | Geissmann . |
| 4,366,750 | 1/1983 | Brown et al. . |
| 4,476,848 | 10/1984 | Protas . |
| 4,562,771 | 1/1986 | Williams . |
| 4,922,079 | 5/1990 | Bowen et al. . |
| 5,497,697 | 3/1996 | Promny ..................... 99/427 |
| 5,575,196 | 11/1996 | Masel et al. . |
| 5,590,584 * | 1/1997 | Ahn ...................... 99/421 V X |
| 5,910,352 | 6/1999 | Fakieh . |
| 5,974,957 * | 11/1999 | Yeen ......................... 99/427 |
| 6,029,565 * | 2/2000 | Plymale ................. 99/427 X |
| 6,079,319 * | 6/2000 | Doria ..................... 99/427 X |
| 6,119,584 * | 9/2000 | Hsu ........................ 99/427 X |

FOREIGN PATENT DOCUMENTS

| | | |
|---|---|---|
| 850066C | 9/1952 | (DE) . |
| 0140237A | 5/1985 | (EP) . |
| 300306A2 | 1/1989 | (EP) . |
| 7004 * | of 1893 | (GB) ........................ 99/427 |
| WO9527427 | 10/1995 | (WO) . |

* cited by examiner

*Primary Examiner*—Reginald L. Alexander
(74) *Attorney, Agent, or Firm*—Dilworth & Barrese, LLP

(57) ABSTRACT

A rotisserie cooking apparatus is provided that includes a housing defining a cavity. A heating element apparatus is positioned within the housing for heating food articles. A detachable cooking rack is configured for support of the food articles and has at least a portion thereof being movably disposed within the cavity such that the food articles are movable relative to the heating element apparatus. The housing may include a grease tray configured for collection of a portion of the food articles. The grease tray may be configured for boiling a substance such that the substance cooks at least a portion of the food articles. The cooking apparatus may include a control unit operatively coupled to the heating element apparatus for controlling operation thereof. The control unit includes a display mounted to an outer surface of the housing. The detachable cooking rack can be supported by the housing for rotational movement such that at least a portion of the detachable cooking rack rotates through the cavity. The detachable cooking rack may include a handle for manipulation thereof. Alternatively, the detachable cooking rack includes at least one detachable segment configured for support of food articles. The rotisserie cooking apparatus may include a motor assembly that is operatively associated with the detachable cooking rack to facilitate movement thereof. A heat shield may be attachable to an outer surface of the housing. The heat shield is configured to enclose at least a portion of the detachable cooking rack.

31 Claims, 9 Drawing Sheets

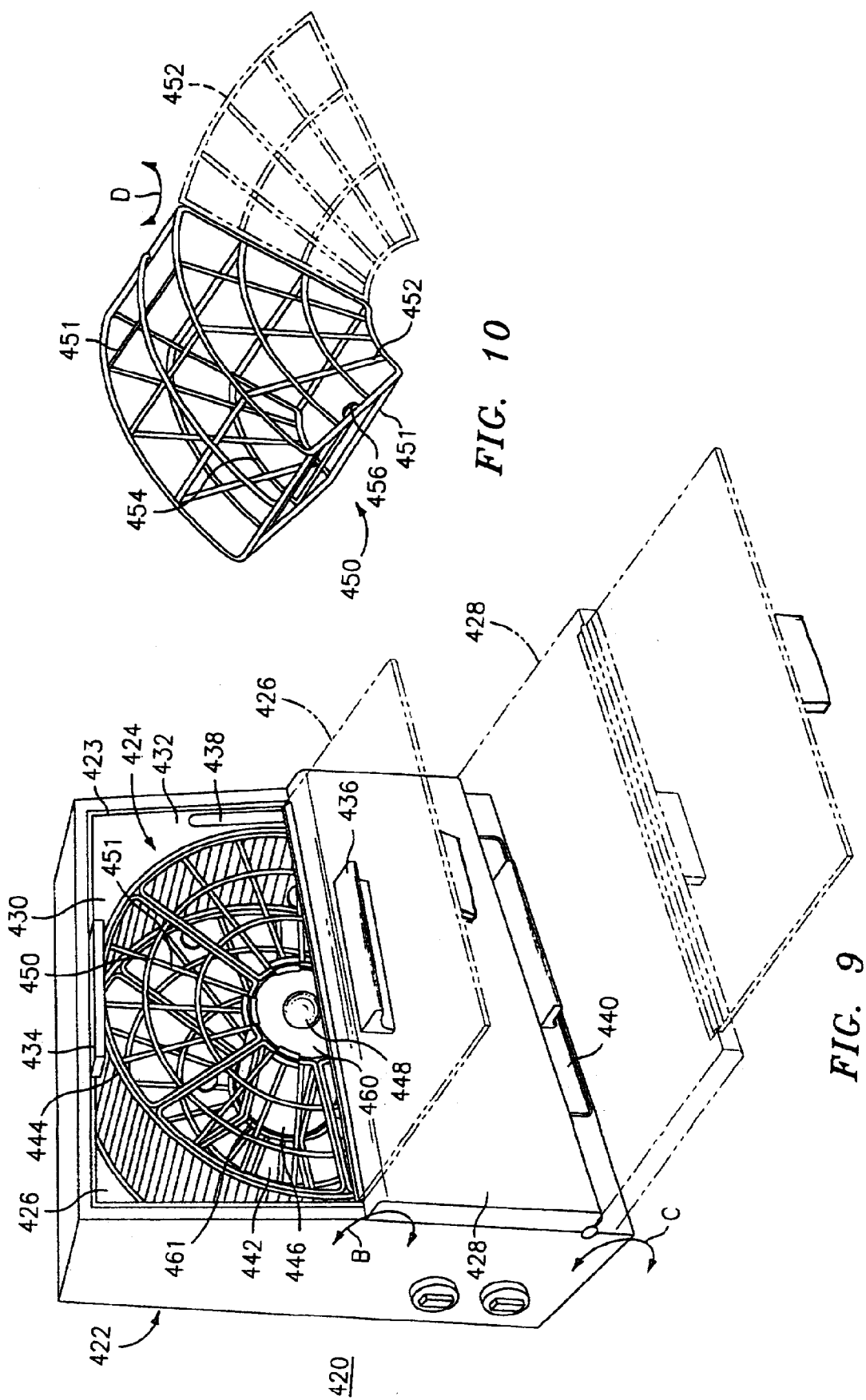

ROTISSERIE COOKING APPARATUS

CROSS-REFERENCE TO RELATED APPLICATION

This application claims priority to U.S. Provisional Application Serial No. 60/161,964 filed in the U.S. Patent and Trademark Office on Oct. 28, 1999 by Boris Usherovich, the entire contents of which being hereby incorporated by reference.

BACKGROUND

1. Field of the Invention

The present invention relates to cooking appliances, and more particularly, to a rotisserie cooking apparatus which is portable and facilitates convenient handling and cooking of food articles.

2. Description of the Related Art

Rotisserie cooking units are known in the prior art. Rotisserie cookers are used to cook food articles, such as, for example, chicken, roasts, fish, steaks, shish-kebab, etc.

Rotisserie cookers are advantageous because they seal in the natural juices of the food articles while draining off unwanted fat.

Typically, rotisserie cooking units slowly rotate food articles above or adjacent aheat source or heating element. The heating element may be placed in the bottom of the cooker unit such that heat will rise and cook the food articles, or above the food for broiling.

Rotisserie cooking units and methods are known whereby the food articles rotate about a vertical axis in close proximity to a heat source, usually of the resistive electric type, positioned radially of the food articles to be cooked, or centrally along an axis of rotation. Such devices are disclosed, for example, in U.S. Pat. No. 3,221,638 to Wickenburg, U.S. Pat. No. 4,270,444 to Geissman, U.S. Pat. No. 4,366,750 to Brown and U.S. Pat. No. 5,575196 to Masel et al. Food articles must be manually removed from an interior heating chamber of these type rotisserie cookers. This demands the troublesome chore of carefully manipulating food articles from within the rotisserie cooker without affecting the food articles or injuring oneself by inadvertent contact with the heating element or hot parts inside the cooking chamber.

Small countertop ovens are also available. These ovens are commonly referred to as toaster ovens and are manufactured by a wide variety of domestic and foreign producers. Most such toaster ovens are substantially similar in size, features and functions. The main differences between the various toaster ovens available concern details of the controls and minor differences in the oven capacity and proportions. In a toaster oven, food remains stationary with respect to adjacent heating elements, typically located above and/or below the food platform. These kinds of toaster ovens are generally popular, based on their portable qualities and ability to be placed in areas providing relatively small available space. However, cooking with a toaster oven does not eliminate the cumbersome and potentially dangerous task of retrieval of food articles from an interior heating chamber of the toaster oven.

Attempts have been made to overcome this drawback. U.S. Pat. No. 4,476,848 discloses a countertop oven with a heating tray, having heat-resistant handles for sliding the tray directly into a front portion of the countertop oven. However, this type of toaster oven does not provide the advantageous features of a rotisserie cooker. Furthermore, current rotisserie cooker designs do not facilitate easy manipulation of food articles and prevention of injury to a user.

Another disadvantage of the above mentioned cooking devices is the inability to adequately view the food articles and monitor their preparation. These cooking devices typically include only a small window and/or cooking light which does not provide sufficient viewing capability for monitoring food preparation.

Therefore, it would be desirable to have a rotisserie cooking apparatus that is portable for positioning in various locations. In addition, it would be desirable to have a rotisserie cooking apparatus that facilitates easy manipulation of food articles being prepared and avoids injury to a user of the rotisserie cooking apparatus. It would also be desirable for such an apparatus to provide uniform heating of food articles while displaying the food articles being prepared.

Accordingly, it is an object of the present invention to have a rotisserie cooking apparatus that is portable for positioning in various locations. It is another object of the present invention to provide a rotisserie cooking apparatus that facilitates easy manipulation of food articles being prepared and prevention of injury to a user of the rotisserie cooking apparatus.

It is yet another object of the present invention to provide a rotisserie cooking apparatus that provides uniform heating of food articles while displaying the food articles being prepared.

It is still another object of the present invention to provide a rotisserie cooking apparatus which is easily assembled and operated.

SUMMARY OF THE INVENTION

In accordance with the present invention, a rotisserie cooking apparatus is provided that is portable for positioning in various locations and facilitates easy manipulation of food articles being prepared and prevention of injury to a user.

In one particular embodiment, a rotisserie cooking apparatus is provided that includes a housing defining a cavity. A heating element apparatus is positioned within the housing for heating food articles. At least a portion of the heating element apparatus may be disposed within the cavity. A detachable cooking rack is configured for support of the food articles and has at least a portion thereof being movably disposed within the cavity such that the food articles are movable relative to the heating element apparatus. The rotisserie cooking apparatus is preferably configured for rotisserie cooking. Alternatively, however, the apparatus may include or form at least a portion of other types of cooking appliances and/or devices.

The housing may include a substantially rectangular enclosure including an opening to the cavity that is configured for receipt of at least a portion of the detachable cooking rack. The housing may include an outer surface fabricated from a thermally insulative material. The housing may include a drip or grease tray that is positionable relative to the detachable cooking rack and configured for collection of grease and other debris falling from the food articles as they cook. The grease tray may be positioned within the cavity of the housing with at least a portion of the detachable cooking rack moving through the grease tray. The grease tray can be configured for boiling a substance therein such that the substance cooks, roasts and/or fries at least a portion of the food articles in the detachable cooking rack when passing therethrough.

The heating element apparatus may include a first heating element and a second heating element that are spaced apart in the cavity to facilitate heating of the food articles. At least a portion of the detachable cooking rack can be disposed in the cavity of the housing between the first and second heating elements. Desirably, the first and second heating elements are mounted at opposing sides of the cavity.

The detachable cooking rack is supported by the housing and rotates relative to the housing. The detachable cooking rack may be supported by the housing for rotational movement such that at least a portion of the detachable cooking rack rotates through the cavity. The detachable cooking rack includes an axle defining an axis of rotation for the detachable cooking rack, the axle being supported by and rotatable relative to the housing. Thus, the housing may include grooves that receive the axle and allow rotation. The detachable cooking rack may include a handle for manipulation, including removal of the cooking rack from the housing. In an alternate embodiment, the detachable cooking rack includes a first portion and a second portion having grill-type configurations to facilitate support of the food articles therein.

In another alternate embodiment, the detachable cooking rack defines a cavity wherein at least a portion of the cavity of the detachable cooking rack is enclosed by one or more mesh wall portions. The mesh wall may enclose substantially all of the cavity of the detachable cooking rack. The detachable cooking rack may include an adjustment portion configured to facilitate support of the food articles supported by the detachable cooking rack according to the configuration and dimension of the food articles. The detachable cooking rack may include a detachable hub supported by the housing and rotatable relative thereto. The detachable hub has at least one skewer projecting therefrom. Desirably, the detachable hub has a plurality of skewers projecting therefrom.

In another embodiment, substantially all of the detachable cooking rack is movably disposed within the cavity of the housing. The housing may include at least one door having at least a portion thereof disposed adjacent to the opening of the housing. The door is movable to enclose at least a portion of the cavity. At least a portion of the detachable cooking rack may be detachable from the detachable cooking rack. The detachable cooking rack may include at least one detachable segment configured for supporting the food articles. The detachable segment advantageously facilitates removal of fully prepared food articles from the cooking apparatus while permitting continued preparation of other food articles supported by the detachable cooking rack. The detachable cooking rack may have a plurality of detachable segments. The plurality of detachable segments may be radially spaced about a central axis defined by the detachable cooking rack. The detachable segment can define a cavity substantially enclosed by walls. The walls may have a grill-type configuration, mesh wall, etc.

A heat shield may be attachable to an outer surface of the housing. Such a heat shield is configured to substantially enclose at least a portion of the detachable cooking rack. The heat shield may be removably attachable to the housing. Preferably, the heat shield is transparent to facilitate viewing of food articles when cooking. This feature advantageously facilitates determining when food preparation is complete. In an alternate embodiment, the heat shield may be removably attached to the detachable cooking rack.

In an alternate embodiment, the rotisserie cooking apparatus includes a control unit having a processor disposed within or adjacent the housing. The control unit is operatively coupled to the heating element apparatus for controlling operation thereof. The control unit includes a display mounted to an outer surface of the housing. The control unit includes circuitry for supplying power to the heating element apparatus for activation of the heating element apparatus.

The control unit may include a temperature sensor disposed in the cavity of the housing that provides a temperature signal indicative of a predetermined temperature. The control unit is operatively responsive to receiving the temperature signal to deactivate the heating element apparatus.

The control unit may include a timer mounted to the housing for detecting expiration of a predetermined time period. The timer provides a time signal indicative of the predetermined time period. The control unit is operatively responsive to receiving the time signal to deactivate the heating element. In another embodiment, the control unit includes a safety shutoff disposed in the housing and operatively responsive to a signal received from a sensor element interfacing with the detachable cooking rack and correspondingly deactivating the heating element apparatus. The signal may indicate, for example, jamming of the detachable cooking rack. Controls and indicators may be included, such as, for example, timer, temperature, on/off indicator etc., which are mounted to the housing and displayed from an outer surface thereof.

In another alternate embodiment, the rotisserie cooking apparatus includes a motor assembly that is operatively associated with the detachable cooking rack to facilitate movement thereof. The motor assembly may be operatively associated with the axle of the detachable cooking rack to facilitate rotational movement thereof. The motor assembly may include an electric motor and a drive gear. The drive gear may mesh with a corresponding gear on the axle of the detachable cooking rack for causing rotation thereof.

In another alternate embodiment, the rotisserie cooking apparatus includes a housing comprising a rectangular enclosure with a slot. Heating elements are disposed within the housing on at least one side of the slot. The detachable cooking rack includes a circular wire formed grill assembly configured for supporting food articles disposed therein.

BRIEF DESCRIPTION OF THE DRAWINGS

The accompanying drawings, referred to herein and constituting a part hereof, illustrate the exemplary embodiments of the rotisserie cooking apparatus of the present invention and, together with the description, serve to explain the principles of the invention.

FIG. 9 is a perspective view of an alternate embodiment of the rotisserie cooking apparatus in accordance with the present invention and showing open positions of upper and lower doors in phantom; and FIG. 10 is a perspective view of a detachable segment of a detachable cooking rack shown in FIG. 9 and showing the detachable segment in an open position in phantom.

DETAILED DESCRIPTION OF THE EXEMPLARY EMBODIMENTS

Figure 1:
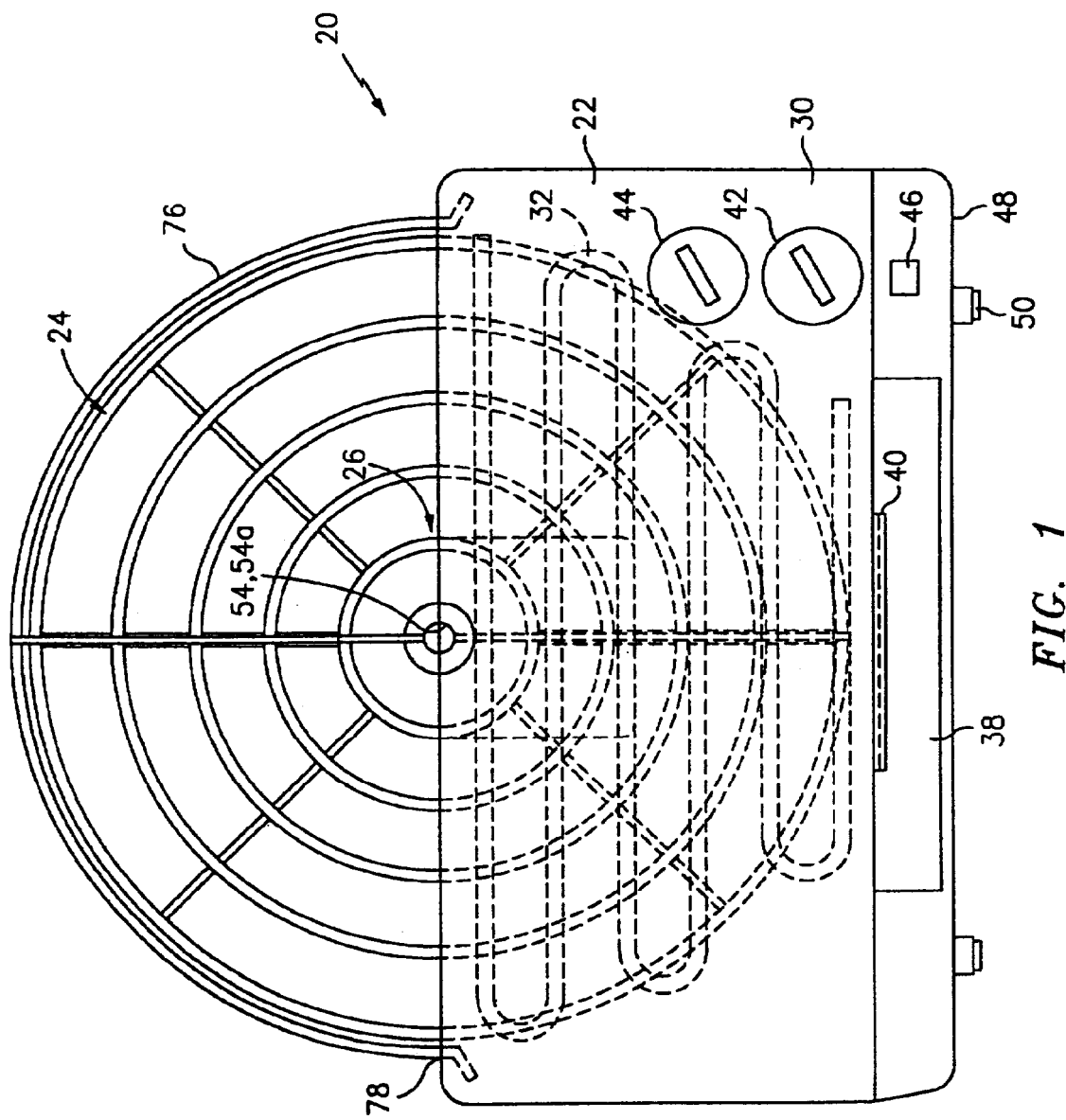
FIG. 1 is a front view of a rotisserie cooking apparatus in accordance with the present invention, showing a portion of the apparatus in phantom.
Figure 2:
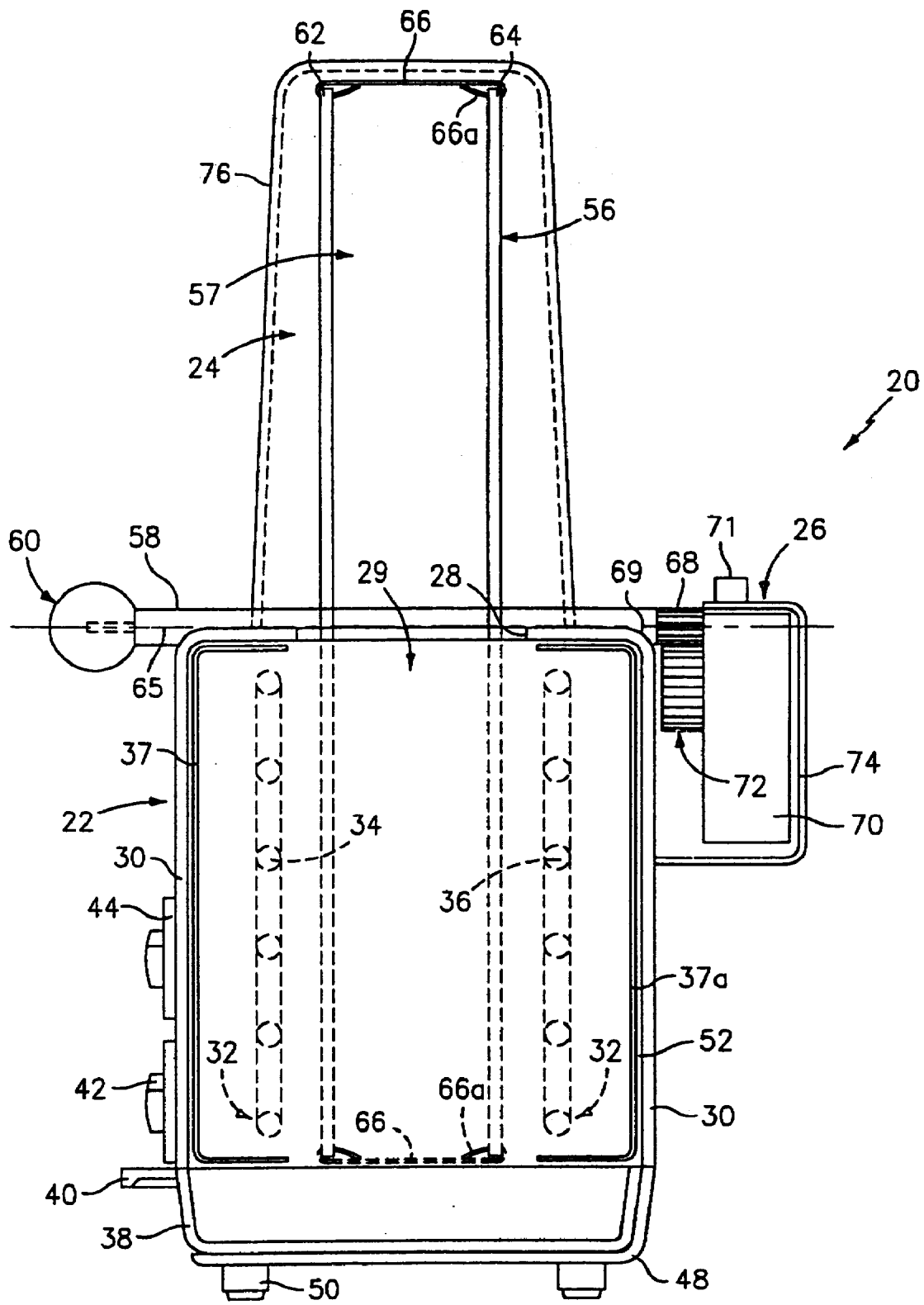
FIG. 2 is an end view of the rotisserie cooking apparatus shown in FIG. 1, in partial cross-section.

Referring now to the drawings in detail wherein like reference numerals identify similar structural elements of the subject invention and referring initially to FIGS. 1 and 2, there is illustrated a rotisserie cooking apparatus 20, in accordance with one embodiment of the present invention. Rotisserie cooking apparatus 20 includes a housing 22, a detachable cooking rack 24 and a motor assembly 26.

The rotisserie cooking apparatus facilitates preparation of food articles, such as, for example, chicken, beef, fish, etc. The design of the rotisserie cooking apparatus advantageously facilitates positioning and easy manipulation of the food articles while preventing injury to a user. Although described in terms of rotisserie cooking, it is envisioned that the apparatus, in accordance with the principles of the present invention, may include or form at least a portion of other types of cooking appliances and/or devices. It is envisioned that the cooking apparatus, in accordance with the principles of the present invention, may be employed in commercial and/or non-conmercial applications.

Housing 22 is preferably a substantially rectangular enclosure for supporting at least a portion of detachable cooking rack 24. It is contemplated that housing 22 may have other geometric configurations, such as, for example, triangular, oval, substantially circular, etc. The components, discussed below, of housing 22 are manufactured and assembled in accordance with the knowledge of one skilled in the art and should be suitable for cooking appliance applications.

Referring to FIGS. 1 and 2, housing 22 defines an upper opening 28 and a cavity 29 for receipt of detachable cooking rack 24. Outer surface 30 of housing 22 is fabricated from a thermally insulative material to advantageously prevent injury to a user. Outer surface 30 may be fabricated from durable materials that can be easily cleaned, such as, for example, thermoplastics, polymerics, etc. It is also contemplated that the outer surface may be fabricated from a corrosion resistant material, such as, for example, stainless steel or aluminum and coated for non-adherence with for example, polytetrafluoroethylene. Outer surface 30 may be removable for access to the components of the housing for cleaning and maintenance.

A heating element apparatus 32 is positionable within cavity 29 of housing 22. Heating element apparatus 32 includes a first heating element 34 and a second heating element 36. Each element is attached to opposite sides of housing 22 and spaced apart within cavity 29 to receive part of detachable cooking rack 24 therebetween. First and second heating elements, 34 and 36, are of the electric resistive type and provide uniform heating to food articles disposed in detachable cooking rack 24.

Heat reflectors 37, 37a are positioned adjacent heating elements 34 and 36, respectively, between heating elements 34, 36 and outer surface 30 of housing 22. Heat reflectors 37, 37a enhance the heating capability of rotisserie cooking apparatus 20 by insulating and reflecting heat produced by heating element apparatus 32 into cavity 29. It is contemplated that heat reflectors 37, 37a are chrome plated. It is further contemplated that heat reflectors 37, 37a are removable. It is envisioned that heating element apparatus 32 may include other heat emitting devices suitable for cooking appliance applications, and it is also envisioned that one of elements 34 and 36 may be omitted.

Housing 22 includes a grease tray 38 which is configured for collection of a portion of the food articles, such as, for example, juices, fats, etc. Grease tray 38 is disposed within a bottom portion of housing 22, below detachable cooking rack 24. Grease tray 38 includes a handle 40 for manipulation thereof for insertion and removal of grease tray 38 from housing 22. Grease tray 38 and handle 40 are also clearly shown in FIGS. 1 and 3. Grease tray 38 is fabricated from a heat resistant material that is easily cleaned. The grease tray may be manufactured from thermoplastics, borosilicate glass, etc., or alternatively may be made from a corrosion resistant material, such as, for example, stainless steel or aluminum, and coated for non-adherence with, for example, polytetrafluoroethylene.

Rotisserie cooking apparatus 20 includes a control and indicator unit which may have processor portions (not shown) disposed within housing 22 and display portions mounted to outer surface 30, discussed below. The unit includes various ergonomic features for operation of the rotisserie cooking apparatus. Referring to FIGS. 1–4, a timer 42 is mounted to outer surface 30 of housing 22. Timer 42 is manually set by a user and is constructed in accordance with the knowledge of one skilled in the art. A temperature control knob 44 is also mounted to outer surface 30. Temperature control knob 44 is manually set by a user and is constructed in accordance with the knowledge of one skilled in the art for regulating the amount of heating produced by heating element apparatus 32.

Activation of timer 42 activates heating element apparatus 32. Activation of timer 42 activates heating element apparatus 32 and an electric motor 70. Motor 70 has a control switch 71 that facilitates stopping motor 70 and corresponding movement of detachable cooking rack 24 while heating element apparatus 32 is on. Control switch 71 temporarily discontinues rotisserie motion of detachable cooking rack 24. This pause or temporary discontinuation of movement may facilitate, for example, food article temperature measurement of food articles supported by detachable cooking rack 24 disposed outside of cavity 29 of housing 22. Alternatively, control switch 71 may facilitate intensive spot heating for food articles disposed within cavity 29 adjacent heating element apparatus 32. Control switch 71 may be mounted on rotisserie cooking apparatus 20 at various locations.

An on/off indicator, such as, for example, pilot light 46 indicates cooking operational status. The components of the controls and indicator unit such as timer 42 and control knob 44 may be electronic and programmable as is known or may include other ergonomic features that are known. In an alternate embodiment, the controls and indicator unit include an appropriate processor and electronics that provide an automatic safety shutoff. The automatic safety shutoff operates, for example, by receiving a signal, such as, for example, a jamming signal generated by a motion sensor that interfaces with detachable cooking rack and indicates when detachable cooking rack 24 is not moving. The automatic safety shutoff may alternatively provide, for example, resetting timer 42, deactivating heating element apparatus 32 when a temperature is exceeded, etc.

Housing 22 includes a bottom panel 48 for supporting the housing and receiving the grease tray 38. Foot pegs 50 are attached to a bottom surface of bottom panel 48. Foot pegs 50 facilitate positioning of rotisserie cooking apparatus 20 on a surface and provide stability during operation. Foot pegs 50 include rubber bottoms or the like to advantageously provide anti-skid features.

Figure 3:
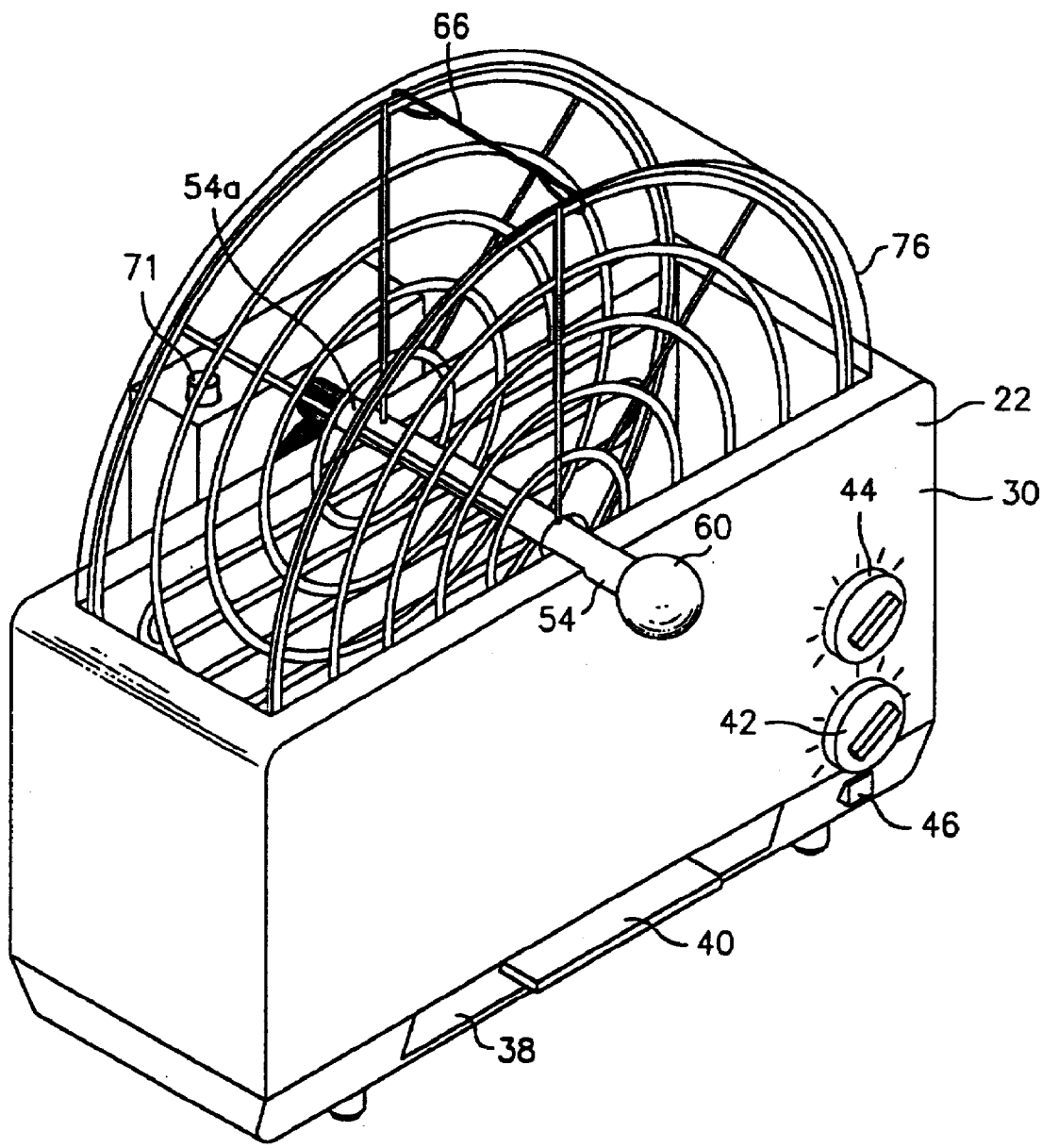
FIG. 3 is a perspective view of the rotisserie cooking apparatus shown in FIG. 1.

As best seen in FIG. 3, housing 22 defines support grooves 54, 54a for removable support of detachable cooking rack 24. Support grooves 54, 54a are formed transversely across a top portion of housing 22 for removable support of a portion of detachable cooking rack 24 as explained further below.

Detachable cooking rack 24 includes a support assembly 56, an axle 58 and a manipulation handle 60. It is contemplated that handle 60 may be configured as a knob, post, etc., for manipulation by a user. Detachable cooking rack 24 is substantially cylindrical and is configured for partial detachable receipt within cavity 29 of housing 22 and rotation therein facilitating rotisserie cooking. It is contemplated that detachable cooking rack 24 may have other geometric configurations such as, for example, rectangular, pentagonal, etc., for rotation within cavity 29. Referring to FIG. 2, support assembly 56 includes a first portion 62 and a second portion 64. Each portion has a grill-type configuration for support of food articles (not shown) therebetween.

First portion 62 and second portion 64 are coupled together by a series of hinges 66 along the outer circumference. Hinges 66 include a bend portion 66a that is manipulably bent or twisted to release hinge 66 from second portion 64 to expose a cavity 57 of detachable cooking rack 24 so that food articles can be positioned within support assembly 56. It is contemplated that first and second portions 62, 64, may be coupled together by other means such as, for example, clips, wires, etc. The components of support assembly 56 may be fabricated from corrosion resistant materials which are easily cleaned such as, for example, stainless steel or aluminum. It is envisioned that first and second portions 62, 64, may have other cooking configurations such as, for example, wider grill rods, solid portions or combinations thereof, depending on the particular cooking application. There may also be one or more food racks extending between first and second portions 62, 64 that support food articles.

Figure 5:
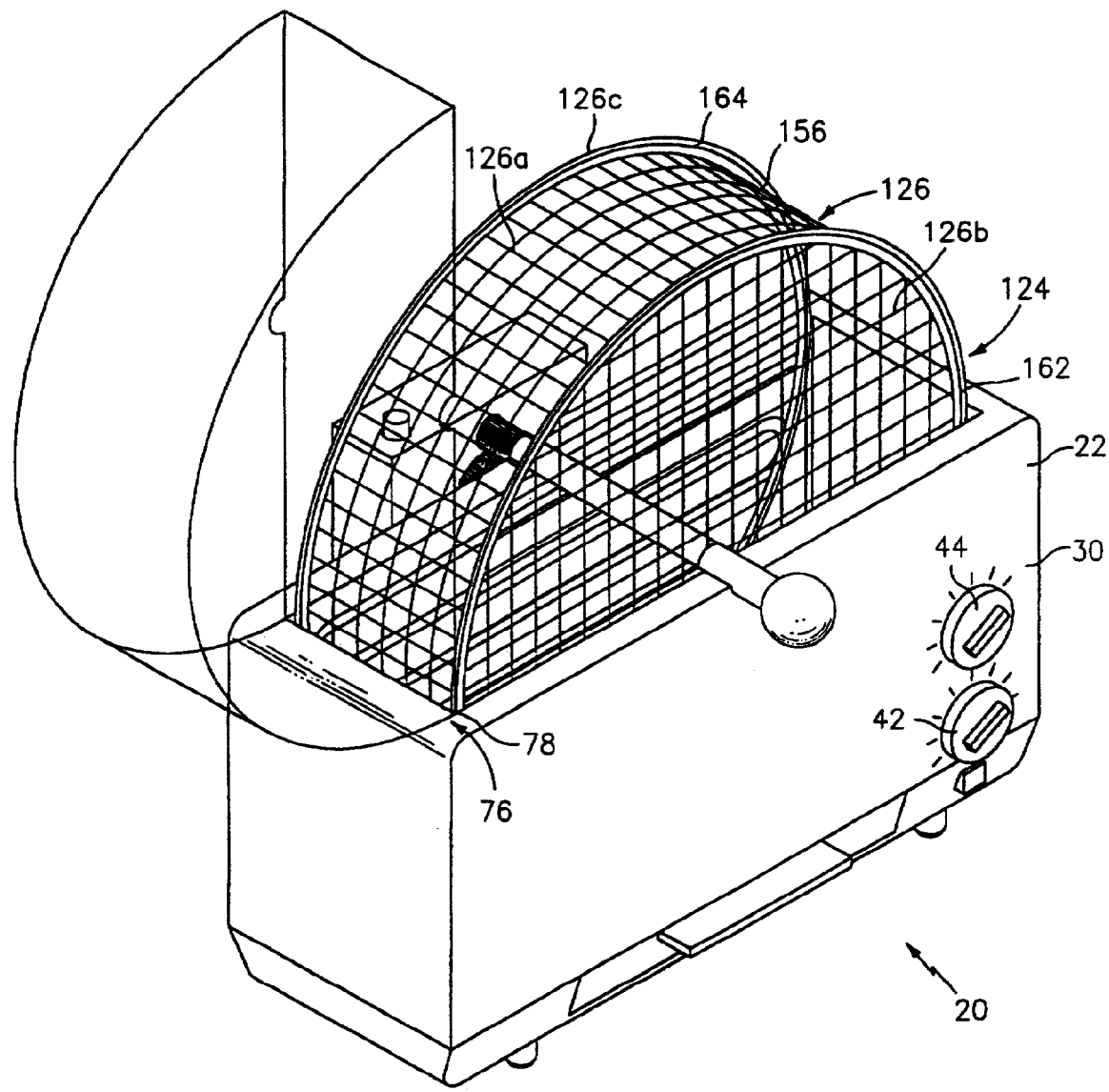
FIG. 5 is a perspective view of the rotisserie cooking apparatus shown in FIG. 1 including an alternate embodiment of a detachable cooking rack.
Figure 6:
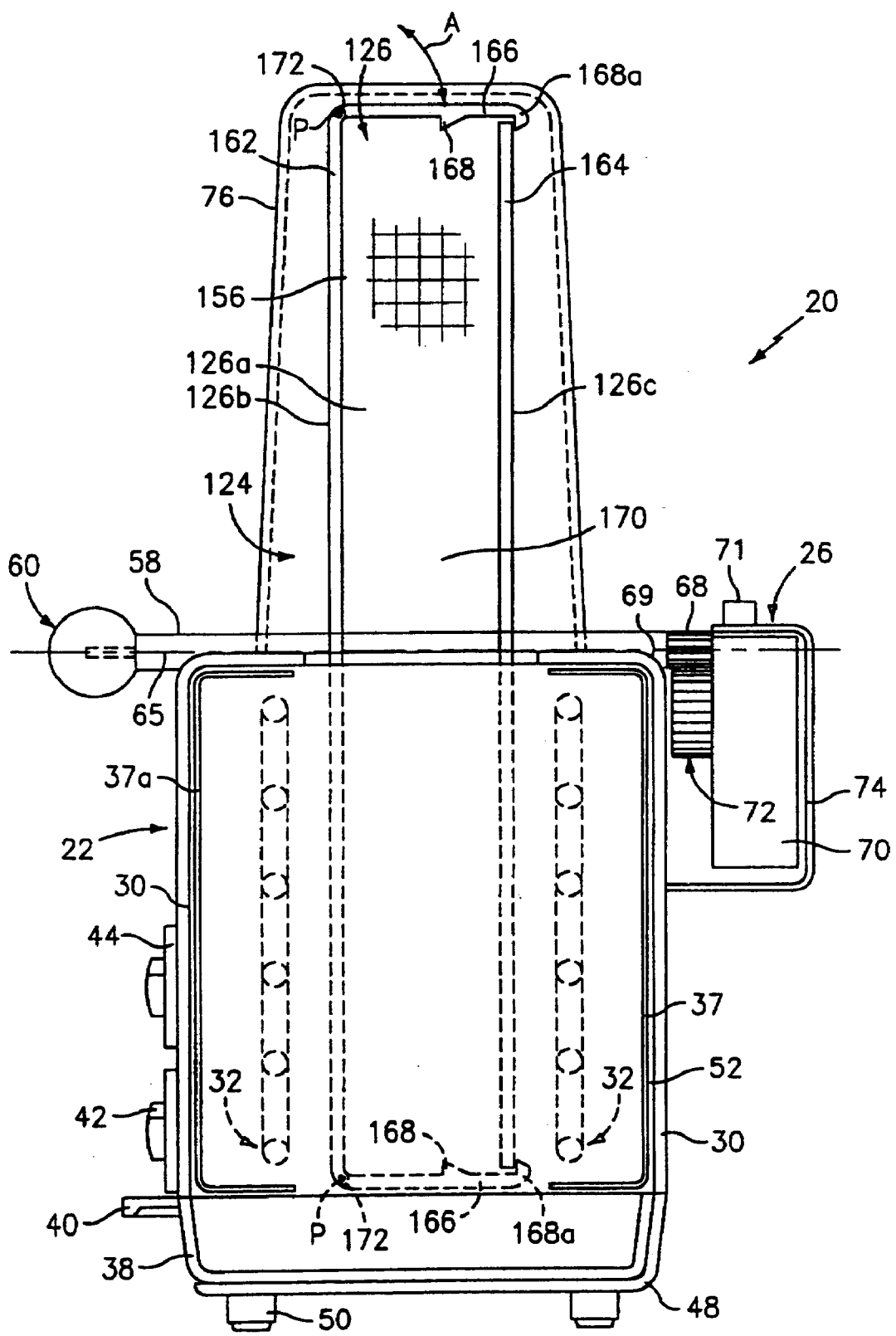
FIG. 6 is an end view of the rotisserie cooking apparatus shown in FIG. 5.

Referring temporarily to FIGS. 5 and 6, an alternate embodiment of rotisserie cooking apparatus 20 includes an alternative embodiment of a detachable cooking rack 124 having a support assembly 156. Support assembly 156 includes a mesh wall portion, such as, for example, a wire mesh container 126 having a mesh-like configuration including a multiplicity of openings similar to a net or the like. Wire mesh container 126 is rigidly formed for support of food articles (not shown) and includes a side wall portion 126a, a first wall portion 126b, and a second wall portion 126c. First portion 162 and a second portion 164 of support assembly 156 provide a frame for wire mesh container 126.

First portion 162 and second portion 164 each comprise circular rods that support wire mesh container 126. First wall portion 126b is disposed within an interior area defined by first portion 162 and second wall portion 126c is disposed within an interior area defined by second portion 164. Side wall portion 126a is circumferentially disposed about support assembly 156, between first portion 162 and second portion 164 such that, in cooperation with portions 126b, 126c, wire mesh container 126 completely encloses food articles (not shown) supported by detachable cooking rack 124 in a food basket-like configuration. The food articles are contained by wire mesh container 126 of detachable cooking rack 124 during cooking and/or movement thereof. It is contemplated that support assembly 156 may be used as a strainer before or after cooking.

Wire mesh container portions 126a, b, c are attached to adjacent portions of first portion 162 and second portion 164 by known techniques, such as, for example, brazing, welding, etc. It is envisioned that clips, hinges, etc., may be used additionally or in the alternative. Wire mesh container 126 is integrally formed of its constituent portions and fabricated from a material suitable for cooking applications which is, preferably, corrosion resistant and easily cleaned. It is contemplated that such materials may include metals, such as, for example, stainless steel, aluminum, etc., or heat resistant polymerics, having a mesh configuration. Wire mesh container 126 may be monolithically formed and assembled to interior and/or exterior portions of support assembly 156. Alternatively, wire mesh container 126 may be fabricated from metal that is perforated. It is contemplated that wire mesh container 126 may include side wall portion 126a only. It is further contemplated that first portion 162 and second portion 164 may or may not include a grill rod configuration, similar to that shown in FIG. 1, in combination with wire mesh container 126. Wire mesh container 126 may also be non-rigid and flexible.

First portion 162 includes two or more adjustment members 166 extending therefrom, disposed at diametrically opposed positions of support assembly 156. Adjustment members 166 include notches 168, 168a that facilitate coupling of first portion 162 to second portion 164 at different positions along axle 58, thus adapting the support assembly 156 to the configuration and dimension of food articles supported therein. Adjustment members 166 may also facilitate coupling of portions 162, 164 according to the dimensions of cavity 29 of housing 22. This advantageously facilitates use of various cooking racks with various housings.

Adjustment members 166 provide detachable cooking rack 124 with means for adjusting the dimension of a cavity 170 defined by detachable cooking rack 124 for supporting food articles. For example, depending on the configuration and/or quantity of the food articles, first portion 162 and second portion 164 may be coupled at notch 168 or notch 168a. It is contemplated that multiple adjustment members may be disposed about the circumference of detachable cooking rack 124. Alternatively, there may be one contiguous adjustment member extending entirely or substantially entirely around the circumference. It is also envisioned that axle 58 includes a resilient member that engages second portion 164, thereby biasing second portion 164 against adjustment members 166.

Adjustment members 166 are pivotal about a point P (shown by arrow A) for assembly and disassembly of first portion 162 and second portion 164. Pivotal movement of adjustment members 166 is facilitated by a resilient bend 172 of first portion 162. In operation, adjustment members 166 are manually pivoted outwardly about point P, thereby releasing second portion 164 to separate first portion 162 from second portion 164. Adjustment members 166 are released and pivot inwardly due to the resilience of bend 172. Separation of first portion 162 and second portion 164 exposes cavity 170 so that food articles may be placed therein. After food articles are placed in cavity 170, adjustment members 166 are manually pivoted outwardly about point P and second portion is positioned to cover the food articles supported between first portion 162 and second portion 164.

Adjustment members 166 are released, and depending on the configuration and/or dimension of the food articles, notch 168 or 168a engage second portion 164 for supporting food articles by detachable cooking rack 124. First portion 162 and second portion 164 are releasably coupled together due to the engagement of notches 168 or 168a and second portion 164. The food articles are thus surrounded by wire mesh container 126 as detachable cooking rack 124 rotates through cavity 29 of housing 22.

Figure 7:
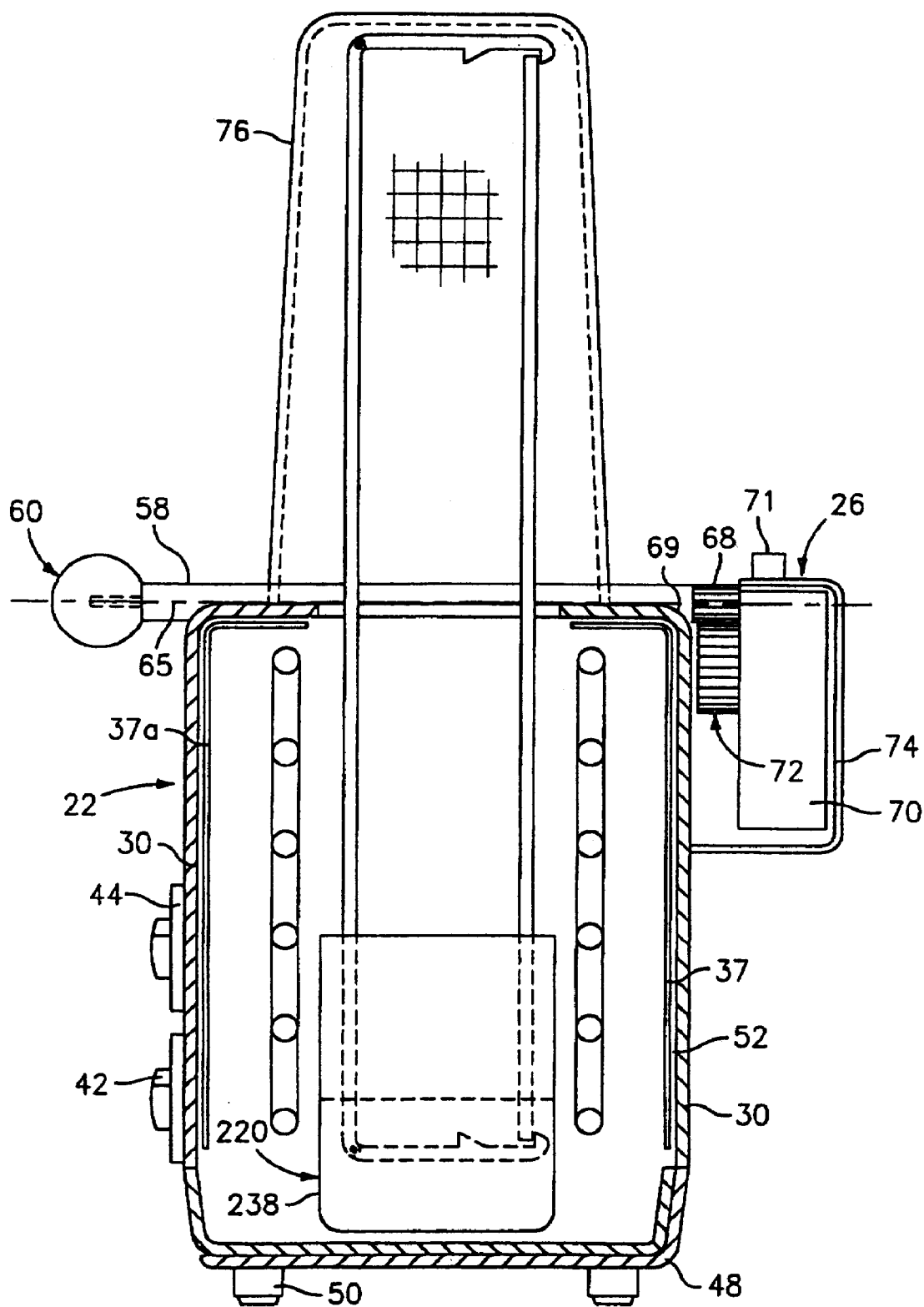
FIG. 7 is an end view of the rotisserie cooking apparatus shown in FIG. 1 including alternate embodiments of the cooking rack and a grease tray.

Referring temporarily to FIG. 7, another alternate embodiment of rotisserie cooking apparatus 20 includes an alternative to grease tray 38 of FIGS. 1–4, namely a frying portion 220 having a grease tray 238 with higher side-walls that contains a cooking oil or other suitable cooking substances. Detachable cooking rack 124, discussed with regard to FIGS. 5 and 6, is rotated through the cooking oil contained in grease tray 238. The oil is, preferably, boiling and may include additives such as, for example, flavorings, broth, etc. As detachable cooking rack 124 rotates through cavity 29 of housing 22 (heated by heating element apparatus 32) and the boiling oil contained in grease tray 238, food articles supported within assembly 156 are heated by rotisserie cooking and drenched in hot oil for frying. It is contemplated that apparatus 20 may operate with fryer portion 220 only.

Referring back now to FIGS. 1–4, axle 58 is centrally positioned within detachable cooking rack 24, providing a central axis of rotation for support assembly 56 of detachable cooking rack 24 thereabout. Axle 58 has an outer surface configured to engage support grooves 54, 54a of housing 22 and are rotatable therein. When so engaged, a lower portion of detachable cooking rack 24 resides in cavity 29 of housing 22. The outer surface of axle 58 is fabricated from a substantially low-friction material facilitating rotation within support grooves 54, 54a.

Handle 60 is fixedly attached to a first end 65 of axle 58. Handle 60 is configured so that detachable cooking rack 24 may be manipulated and/or removed by a user for operation of rotisserie cooking apparatus 20. Handle 60 is fixedly attached to axle 58 by means, such as, for example, threaded engagement, adhesive, etc. It is envisioned that handle 60 may be monolithically formed with axle 58 and/or other portions of cooking apparatus 20. It is contemplated that a handle configuration may be used for manipulation of rotisserie cooking apparatus 20 and/or various components thereof.

Axle 58 includes a gear 68 mounted to a second end 69 of axle 58. Gear 68 is configured for engagement with motor assembly 26, discussed below, when axle 58 is received in grooves 54, 54a, facilitating rotation of detachable cooking rack 24.

Motor assembly 26 includes electric motor 70, a drive gear 72 and a cover 74. Motor 70 is constructed in accordance with the knowledge of one skilled in the art and suitable for cooking appliance applications. Motor 70 is connected to drive gear 72 which correspondingly engages gear 68 of axle 58 when axle 58 is received in grooves 54, 54a. Actuation of motor 70 causes rotation of axle 58 within grooves 54, 54a and thus rotation of detachable cooking rack 24, via the engagement of gears 72 and 68. This, of course, causes food articles in detachable cooking rack 24 to be rotated between heating elements 34, 36. Motor 70 is actuated upon activation of timer 42, discussed above, and is operatively connected thereto, as is known to one skilled in the art. Motor 70 is preferably powered by an alternating current electrical energy source. Cover 74 encloses the components of motor assembly 26.

A heat shield 76 is attached to outer surface 30 of housing 22 adjacent a top portion thereof. Heat shield 76 is hingedly attached to housing 22 at a hinge point 78 shown in FIG. 1. Heat shield 76 is pivotal about hinge point 78 and configured for covering (see FIG. 3) and uncovering (see FIG. 4) an exposed portion of detachable cooking rack 24 which extends outside of cavity 29 of housing 22. Heat shield 76 is substantially semi-circular, corresponding to the circular configuration of detachable cooking rack 24. Heat shield 76 may have other configurations. The heat shield is preferably fabricated from a heat-resistant transparent polymeric material advantageously facilitating viewing of food articles being prepared and preventing injury to a user. The heat shield is transparent so that the food articles can be viewed during preparation, when rotated by motor 70 out of cavity 29 of housing 22. This feature advantageously facilitates determining when food preparation is complete. The heat shield may also be constructed from borosilicate glass and alternatively include openings for release of heat. Alternatively, heat shield 76 may be constructed with at least one handle attached to an outer surface thereof for easy placement and removal of heat shield 76 with apparatus 20.

Figure 4:
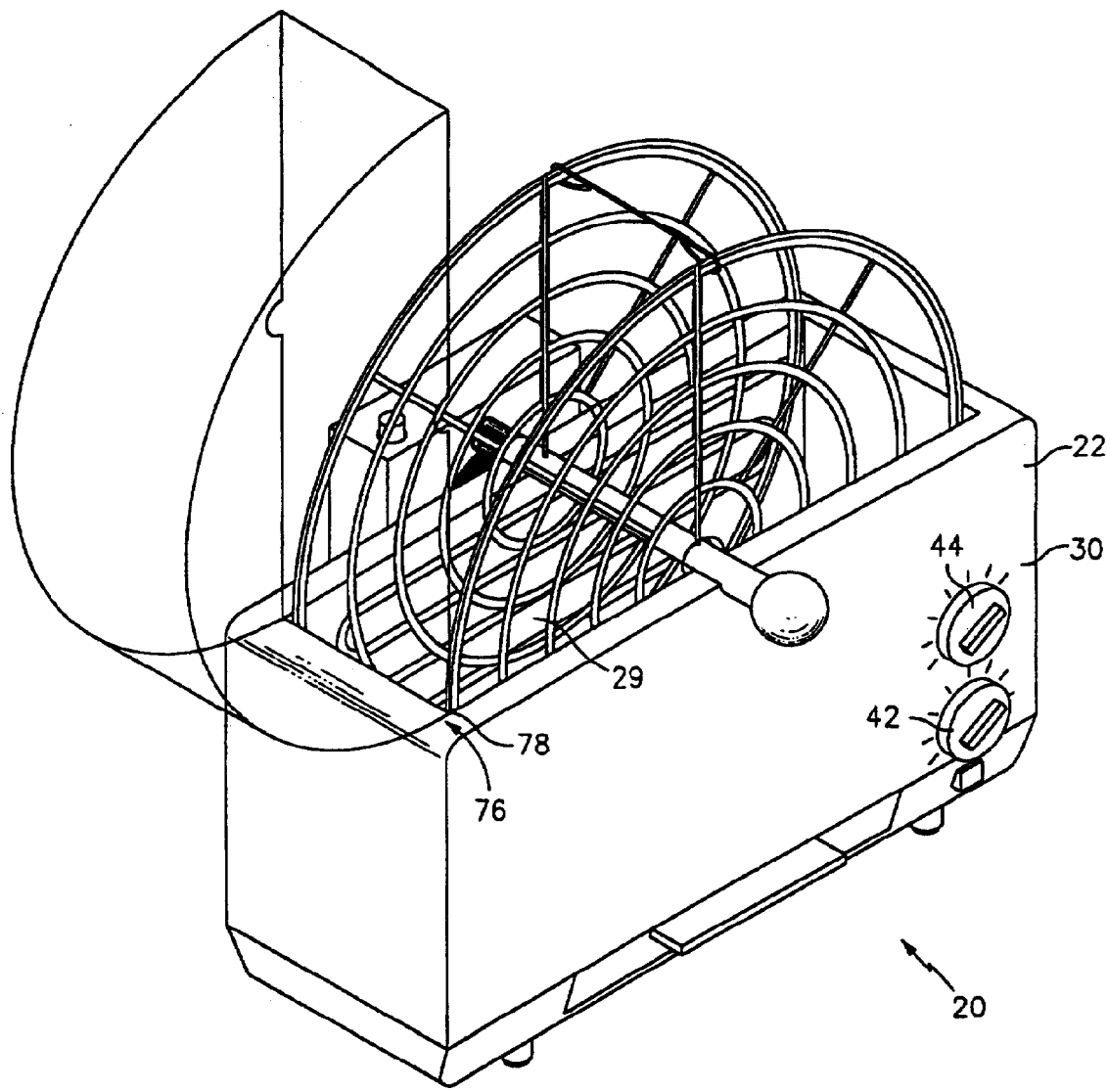
FIG. 4 is a perspective view of the rotisserie cooking apparatus shown in FIG. 1, with a heat shield open.

In operation of rotisserie cooking apparatus 20, heat shield 76 is pivoted about hinge point 78 to expose cavity 29, as shown in FIG. 4. Referring to FIGS. 1 and 2, first portion 62 and second portion 64 of support assembly 56 are separated and food articles (not shown) are positioned in support assembly 56 for preparation thereof. First portion 62 and second portion 64, are coupled together, as discussed above, and manipulation handle 60 is manipulated for transporting detachable cooking rack 24 which is inserted within cavity 29 of housing 22. Axle 58 is supported within support grooves 54, 54a and gear 68 engages drive gear 72 of motor 70.

Heat shield 76 is pivoted about hinge point 78 to enclose the exposed semi-circular portion of detachable cooking rack 24. The remaining semi-circular portion of detachable cooking rack 24 is exposed to heating element apparatus 32. Timer 42 and temperature control 44 are manually set, activating heating element apparatus 32 and actuating motor 70. Chrome plated heat reflector 37, 37a is positioned adjacent heating elements 34 and 36 to enhance rotisserie cooking of the food articles. Pilot light 46 correspondingly indicates operation of rotisserie cooking apparatus 20. Motor 70 causes rotation of detachable cooking rack 24, facilitating rotisserie cooking of the food articles. Preparation of the food articles is monitored through heat shield 76. After the desired food preparation is complete, as viewed through heat shield 76, heat shield 76 is pivoted about hinge point 78 and detachable cooking rack 24 is removed from housing 22 by manipulation of handle 60. The food articles are conveniently removed from housing 22 and injury to a user is prevented as the heat-resistant handle 60 is manipulated to transport detachable cooking rack 24.

Figure 8:
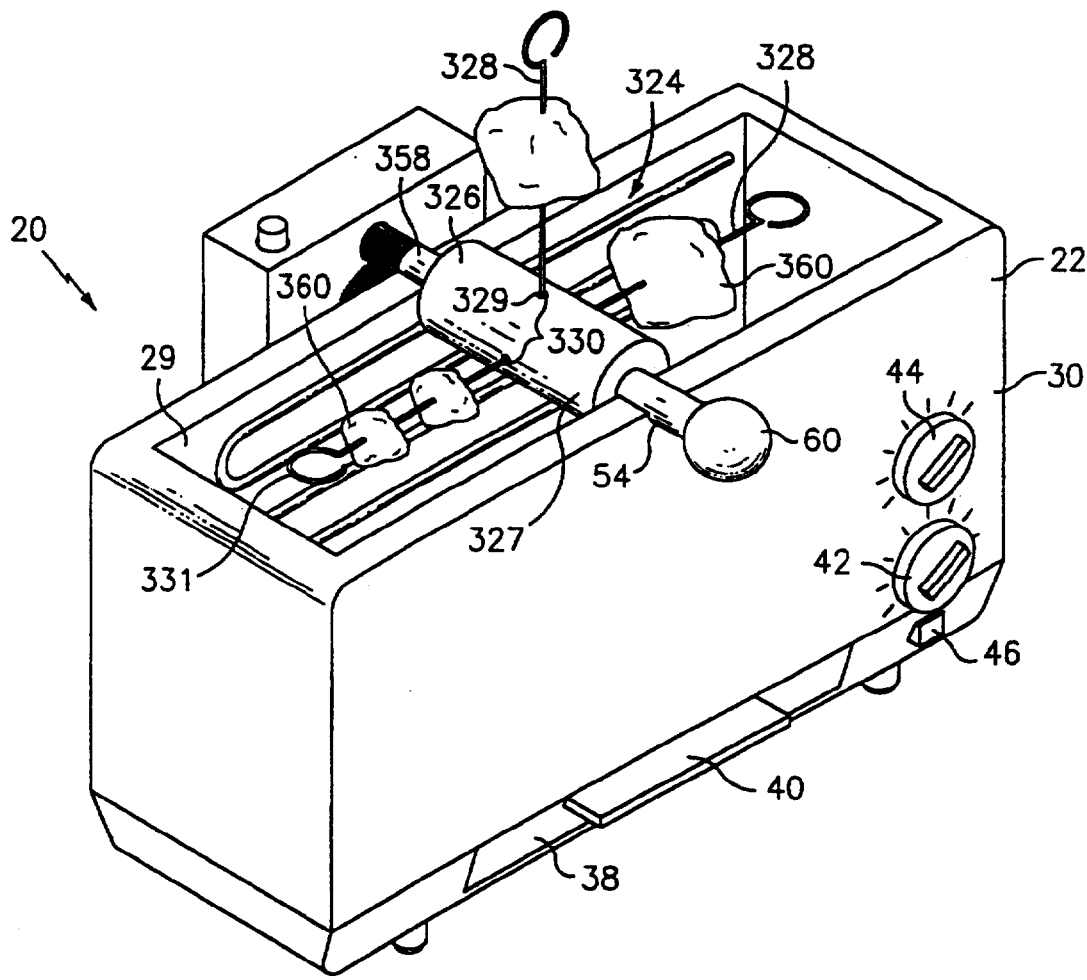
FIG. 8 is a perspective view of the rotisserie cooking apparatus shown in FIG. 1 including another alternate embodiment of a detachable cooking rack.

Referring to FIG. 8, yet another alternate embodiment of rotisserie cooking apparatus 20 is shown. A detachable cooking rack 324 includes a detachable hub 326 which rotates about an axle 358, similar to that described above with regard to FIGS. 1–4. Detachable hub 326 includes skewers 328 configured for support of food articles 360 thereon. Skewers 328 are removably received within cavities 330 of detachable hub 326. Detachable hub 326 has an outer surface 327 fabricated from a durable material suitable for cooking application that can be easily cleaned, such as, for example, thermoplastics, polymers, etc. Outer surface 327 may also be fabricated from a corrosion resistant material, such as, for example, stainless steel or aluminum and coated for non-adherence.

In operation, similar to that described with regard to FIGS. 1–4, skewers 328 are removed from detachable hub 326 by grasping a ring portion 331. Food articles 360 are penetrated by a sharpened tip 329 of skewers 328 facilitating support thereof. Skewers 328, having food articles 360 supported thereon, are inserted into cavities 330 of detachable hub 326. Apparatus 20 is activated, detachable cooking rack 324 is rotated through cavity 29 of housing 22, similar to that described above, and the desired preparation of food articles 360 is completed.

It is contemplated that one or multiple skewers 328 may be employed with detachable cooking rack 324. Skewers 328 may be fixed within detachable hub 326 having tip 329 projecting radially outward for penetration of food articles 360. Although shown as a linear member, skewers 328 may include other configurations having curves, bends, twists, etc. Skewers 328 are fabricated from a material suitable for cooking applications, including those described above.

Although the embodiment of FIG. 8 is depicted without a heat shield, it is readily seen that a heat shield (such as heat shield 76 of FIGS. 1–4) could be adapted to the embodiment of FIG. 8.

Referring to FIGS. 9 and 10, an alternate embodiment, in accordance with the principles of the present invention, is shown. A rotisserie cooking apparatus 420 includes a housing 422, a detachable cooking rack 424 and a motor assembly (not shown), similar to the motor assembly described above. Housing 422 is configured for support and enclosure of detachable cooking rack 424. Housing 422 has an outer surface similar to that described above.

Housing 422 includes an upper door 426 and a lower door 428, disposed adjacent a front opening 423, for enclosing a cavity 430 defined by housing 422. Upper door 426 pivotally moves relative to housing 422 and lower door 428, in the direction shown by arrow B, to expose an upper portion 432 of cavity 430 (shown in phantom), for loading and unloading detachable segments into detachable cooking rack 424, as will be discussed below.

Upper door 426 includes a handle 434 for manipulation thereof. Upon manipulation of handle 434, upper door 426 is pivoted to an open position, exposing upper portion 432 of cavity 430 while lower door 428 remains in a closed position. Upper door 426 may be attached to housing 422 for relative pivotal movement by hinges, etc. Upper door 426 is transparent and fabricated from a material suitable for cooking applications. Upper door 426 advantageously facilitates viewing of food articles supported within detachable cooking rack 424 and may be employed as a heat shield, similar to that described above. It is contemplated that upper door 426 may be fabricated from an opaque material suitable for cooking applications or that upper door 426 may include non-transparent portions.

Lower door 428 pivotally moves relative to housing 422, in the direction shown by arrow C, to expose cavity 430 of housing 422, for loading and unloading detachable cooking rack 424 from cavity 430. It is contemplated that lower door 428 may be pivotally moved to the open position for loading and unloading food articles.

Lower door 428 includes a handle 436 for manipulation thereof and is attached to upper door 426 such that upon manipulation of handle 436, upper door 426 and lower door 428 are pivotally movable to an open position, simultaneously, to expose cavity 430 (shown in phantom). It is contemplated that upper door 426 and lower door 428 may be distinct parts and separately removable from housing 422 and/or pivotal to housing 422 for exposing cavity 430.

Lower door 428 is constructed from an opaque material, but may, however, be constructed from a transparent material, suitable for cooking applications.

Detachable cooking rack 424 is positionable within cavity 430 and upper door 426 and lower door 428 are manipulable to the closed position for enclosing detachable cooking rack 424 within housing 422. A heating element apparatus 438 is positionable within cavity 430 of housing 422, similar to that described above. Housing 422 includes a grease tray 440 and a controls and indicator unit, similar to that described above. Similar to the embodiment discussed with regard to FIG. 7, grease tray 440 may include a fryer portion (not shown). Housing 422 includes a back panel 442 that facilitates support and engagement of detachable cooking rack 424 with the motor assembly.

Detachable cooking rack 424 includes a support assembly 444, an axle 446 and a manipulation handle 448. Detachable cooking rack 424 is substantially cylindrical and configured for detachable receipt within cavity 430 of housing 422 and rotation therein. It is contemplated that detachable cooking rack 424 may be mounted to housing 422 for rotation therein and that portions thereof, such as that discussed below, are detachable from cavity 430.

Support assembly 444 includes a plurality of detachable segments 450. Detachable segment 450 includes walls 451 having a grill-type configuration for support of food articles therein. It is contemplated that detachable segment 450 may have alternate grill configurations, mesh wall, etc.

Detachable segments 450 are detachably loaded and unloaded from detachable cooking rack 424. This feature facilitates loading and/or unloading of food articles from cooking apparatus 420 while other food articles remain therein for continued preparation. This advantageously facilitates preparation of different types of food articles that require different amounts of time for cooking. It is contemplated that detachable segments 450 may be snap-fit, hinged, clipped, etc., with detachable cooking rack 424 for loading and unloading therewith.

Referring to FIG. 10, detachable segment 450 includes a door 452 that pivotally moves relative to detachable segment 450, in the direction shown by arrow D, to expose a cavity 454, defined by walls 451, for loading and unloading of food articles therein. Door 452 includes a handle 456 for manipulation thereof. Upon manipulation of handle 456, door 452 is pivoted to an open position (shown in phantom) for exposing a cavity 454 and loading and unloading food articles therein. Door 452 is pivoted to a closed position for supporting food articles and so that detachable segment 450 may be loaded into detachable cooking rack 424. Door 452 may be snap-fit, clipped, etc., into the closed position. Referring back to FIG. 9, a plurality of detachable segments 450 are radially spaced about axle 446. It is contemplated that particular segments may be fixed with detachable cooking rack 424 or that only portions thereof include detachable segments.

Axle 446, similar to that described above, is centrally positioned within detachable cooking rack 424, providing a central axis of rotation for support assembly 444 of detachable cooking rack 424 thereabout. A second end 461 of axle 446 is attached to the motor assembly to facilitate rotation of cooking apparatus 420. Handle 448 is attached to a first end 460 of axle 446, similar to that described above, for manipulating detachable cooking rack 424.

In operation of rotisserie cooking apparatus 420, handle 436 of lower door 428 is manipulated such that lower door 428 is pivoted, in the direction shown by arrow D, simultaneously with upper door 426, which is attached thereto, to an open position exposing cavity 430 of housing 422.

Detachable cooking rack 424 is removed from cavity 430 by manipulating handle 448. Detachable segments 450 are detached from detachable cooking rack 424. Handle 456 of door as 452 is manipulated to open position to expose cavity 458. Food articles are loaded into detachable segments 450 and door 452 is manipulated to a closed position. Detachable segments 450 are assembled with detachable cooking rack 424. Alternatively, detachable cooking rack 424 remains within cavity 430 and detachable segments 450 are separately removed for loading.

Detachable segments 450 may also remain assembled with detachable cooking rack 424 during loading and unloading of food articles. It is contemplated that only particular detachable segments 450 are loaded with food articles and remaining detachable segments are not loaded with food articles. Time and temperature controls are set, activating the heating element apparatus and the motor assembly, similar to that described above. Preparation of the food articles is monitored through upper door 426.

After the desired food preparation of some or all of the food articles contained in detachable cooking rack 424 is complete, upper door 426 is manipulated to the open position exposing upper portion 432 of cavity 430. Those detachable segments 450 containing food articles which have completed preparation are rotated into upper portion 432 by manipulating handle 448 of detachable cooking rack 424. Detachable segments 450 containing food articles that have been fully prepared are detached from detachable cooking rack 424 while detachable cooking rack 424 is maintained within cavity 430 of housing 422. Therefore, those detachable segments 450 containing food articles which are not fully prepared may continue cooking while the fully prepared food articles can be removed from cooking apparatus 20. For example, a chicken article may require more cooking preparation than a beef article. A detachable segment 450 may contain the chicken article while another segment contains the beef article. Upon full preparation of the beef article, that detachable segment is removed and unloaded and the detachable segment containing the chicken article remains in detachable cooking rack 424 for continued preparation. It is contemplated that food articles may be removed from detachable segments 450 at various degrees of preparation according to the particular cooking application.

The fully prepared food articles are removed from cavity 458 of detachable segments 450 by manipulating door 452 to the open position. The removed detachable segments 450 can be reloaded with unprepared food articles, assembled with detachable cooking rack 424 or remain separated from detachable cooking rack 424. Upper door 426 is manipulated to the closed position and cooking operation of cooking apparatus 420 is resumed until preparation is complete, according to the particular cooking application.

Although the invention has been described with a certain degree of particularity, various modifications may be made to the embodiments disclosed herein. It is, therefore, to be understood that the above description should not be construed as limiting, but merely as an exemplification of the various embodiments.

What is claimed is:

1. A rotisserie cooking apparatus comprising:
   a housing defining a first cavity and including at least one heating element positioned therein;
   a cooking rack rotatably supported on an upper end of said housing such that a first portion of said cooking rack is positioned within said cavity of said housing and a second portion of said cooking rack is positioned outside of said cavity; and
   a heat shield supported on an upper end of said housing, said heat shield defining a second cavity, said second cavity covering said second portion of said cooking rack and being contiguous with said first cavity, wherein the first cavity defines a radiant heating chamber and the second cavity defines a convective heating chamber.

2. A cooking apparatus according to claim 1, wherein said housing includes an outer surface fabricated from a thermally insulative material.

3. A cooking apparatus according to claim 1, wherein said housing includes a grease tray positioned relative to said cooking rack and configured for collection of grease and debris from food articles supported in said cooking rack.

4. A cooking apparatus according to claim 1, wherein said housing includes a grease tray positioned within said first cavity of said housing, at least a portion of said cooking rack being movable through said grease tray.

5. A cooking apparatus according to claim 4, wherein said grease tray is configured for boiling a substance therein such that said substance cooks at least a portion of food articles supported in said cooking rack when passing therethrough.

6. A cooking apparatus according to claim 1, further comprising a control unit having a processor and being disposed within said housing, said control unit being operatively coupled to said at least one heating element for controlling operation thereof, said control unit including a display mounted to an outer surface of said housing, said control unit including circuitry for supplying power to said at least one heating element for activation of said at least one heating element.

7. A cooking apparatus according to claim 6, wherein said control unit includes a temperature sensor disposed in said first cavity that provides a temperature signal indicative of a predetermined temperature, said control unit being operatively responsive to receiving said temperature signal to deactivate said at least one heating element.

8. A cooking apparatus according to claim 6, wherein said control unit includes:
   a timer mounted to said housing for detecting expiration of a predetermined time period, said timer providing a time signal indicative of said predetermined time period, said control unit being operatively responsive to receiving said time signal to deactivate said at least one heating element.

9. A cooking apparatus according to claim 1, wherein said cooking rack includes a first section and a second section, said first and second sections having grill-type configurations to facilitate support of food articles therebetween.

10. A cooking apparatus according to claim 1, further comprising a motor assembly operatively associated with said cooking rack to provide rotational movement thereof.

11. A cooking apparatus according to claim 1, wherein said detachable cooking rack includes a handle for manipulation thereof.

12. A cooking apparatus according to claim 1, wherein said cooking rack defines a cavity, at least a portion of said cavity of said cooking rack being enclosed by one or more mesh wall portions.

13. A cooking apparatus according to claim 12, wherein said one or more mesh wall portions enclose substantially all of said cavity of said cooking rack.

14. A cooking apparatus according to claim 1, wherein said cooking rack includes an adjustment portion configured to facilitate support of food articles supported by said cooking rack according to the configuration and dimension of said food articles.

15. A cooking apparatus according to claim 1, wherein at least a portion of said cooking rack is detachable from the remaining portion of said cooking rack.

16. A rotisserie cooking apparatus according to claim 1, wherein said cooking rack is cylindrical.

17. A rotisserie cooking apparatus according to claim 16, wherein said at least one heating element includes a first heating element positioned on one side of said first cavity and a second heating element positioned on an opposite side of said first cavity.

18. A rotisserie cooking apparatus according to claim 16, wherein said heat shield is formed from a transparent heat-resistant material.

19. A rotisserie cooking apparatus according to claim 18, wherein said heat shield is pivotably fastened to said housing.

20. A rotisserie cooking apparatus according to claim 1, further including an axle, wherein said cooking rack is rotatably supported on said axle.

21. A rotisserie cooking apparatus according to claim 20, wherein said housing includes a pair of spaced support grooves formed in an upper end of said housing, said support grooves being configured and dimensioned to rotatably receive said axle.

22. A rotisserie cooking apparatus according to claim 16, wherein said cylindrical cooking rack includes a diameter which defines a height of the cylindrical cooking rack, said height of the cylindrical cooking rack being substantially greater than the width of the cylindrical cooking rack.

23. A cooking apparatus comprising:
a housing defining a cavity;
a heating element apparatus positioned within said housing for heating food articles and
a detachable cooking rack configured to support said food articles and having at least a portion thereof being movably disposed within said cavity such that said food articles are movable relative to said heating element apparatus, wherein said detachable cooking rack includes a detachable hub being supported by said housing and rotatable relative thereto, said detachable hub having at least one skewer projecting therefrom.

24. A cooking apparatus according to claim 23, said detachable hub having a plurality of skewers projecting therefrom.

25. A cooking apparatus comprising:
a housing defining a cavity;
a heating element apparatus positioned within said housing for heating food articles; and
a detachable cooking rack configured to support said food articles and having at least a portion thereof being movably disposed within said cavity such that said food articles are movable relative to said heating element apparatus;
a control unit having a processor and being disposed within said housing, said control unit being operatively coupled to said heating element apparatus for controlling operation thereof, said control unit including a display mounted to an outer surface of said housing, said control unit including circuitry for supplying power to said heating element apparatus for activation of said heating element, wherein said control unit includes a safety shutoff disposed within said housing and being operatively responsive to a signal receivable from a sensor element interfacing with said detachable cooking rack and correspondingly deactivating said heating element apparatus.

26. A cooking apparatus comprising:
a housing defining a cavity;
a heating element apparatus positioned within said housing for heating food articles; and
a detachable cooking rack configured to support said food articles and having at least a portion thereof being movably disposed within said cavity such that said food articles are movable relative to said heating element apparatus, wherein said detachable cooking rack comprises at least one detachable segment configured for supporting said food articles.

27. A cooking apparatus according to claim 26, wherein said detachable cooking rack comprises a plurality of detachable segments.

28. A cooking apparatus according to claim 26, wherein said detachable segment defines a cavity substantially enclosed by walls.

29. A cooking apparatus according to claim 27, wherein said plurality of detachable segments are radially spaced about a central axis defined by said detachable cooking rack.

30. A rotisserie cooking apparatus comprising:
a substantially rectangular housing including an opening to a cavity defined therein;
a heating unit including a first heating element and a second heating element, said first and second heating elements being mounted on opposing sides of said cavity to facilitate heating of food articles;
a detachable cooking rack driven by a centrally positioned axle that defines an axis of rotation of said detachable cooking rack, said detachable cooking rack being supported by said housing for rotation relative thereto from said axle, said detachable cooking rack having a pair of grill-type portions for support of said food articles and having at least a portion thereof being rotatably disposed within said cavity such that said food articles are movable relative to said heating elements;
a motor assembly including an electric motor and a drive gear, said drive gear meshing with a gear on said axle of said detachable cooking rack, said motor assembly causing rotation of said detachable cooking rack via said meshing gears; and
a transparent heat shield being attachable to an outer surface of said housing and substantially enclosing at least a portion of said detachable cooking rack lying outside of said cavity in the housing.

31. A rotisserie cooking apparatus comprising:
a housing including an opening to a cavity defined therein, said housing further including at least one door having at least a portion thereof disposed adjacent said opening and being movable to enclose said cavity;
a heating element apparatus being positioned within said housing for heating food articles; and
a detachable cooking rack including a plurality of detachable segments configured for support of said food articles, said detachable segments defining a cavity substantially enclosed by walls having a grill-type configuration and being radially spaced about a central axis defined by said detachable cooking rack, said detachable cooking rack being movably disposed within said cavity of said housing such that said food articles are movable relative to said heating element apparatus.

* * * * *